2,713,233

PROCESS AND PRESERVATIVE FOR TREATING CUT PLANTS

Mary P. Rogers, Hilo, Territory of Hawaii

No Drawing. Application November 10, 1952,
Serial No. 319,794

14 Claims. (Cl. 47—58)

My invention relates to novel and useful preservatives and to a method of using same for preserving the freshness of cut foliage over protracted periods of time, during which time the foliage remains fresh and useful for decorative purposes.

The principal object of my invention is to provide a simple and practical preservative and process of using same which preservative and process will be very inexpensive and effective.

Another important object of my invention is to provide a process which may be carried out without the necessity of special equipment, ordinary implements and containers found in the average household being adequate.

My process is intended to make use of a plant found in Hawaii and popularly known as the "Mamaki" plant. It is scientifically known as *Pipturus albidus*, a plant of the nettle family (Urticaceae). I have found that by boiling portions of the Mamaki plant, I can prepare preservatives therefrom which will materially aid in preserving the freshness of cut foliage and flowers.

Turning now to a more detailed description of my invention, the following disclosure will suffice to make clear the method of making my preservatives and the method of using same to preserve certain types of plants:

*Preservative #1*

This preservative is made from the leaves and seeds of the Mamaki plant, said leaves and seeds being picked, preferably during dry weather, and rinsed thoroughly. There should be about one cup of seeds to one pound of leaves, and only fully developed seeds should be used. The seeds and leaves should be ground and the ground mixture in the above quantities placed in a suitable pot. I then pour one gallon of boiling water over the mixture and heat the pot sufficiently to just keep its contents boiling. The pot should be covered and sealed with a lid which can be kept cool so as to cause the steam within the pot to be continuously condensed and the condensed water returned to the pot. This cooking is continued for about 9 hours at the end of which time there will remain about 3½ quarts of liquid. The contents of the pot are then strained and the liquid recovered therefrom, this liquid being the #1 preservative.

*Preservative #2*

Preservative #2 is made in the same manner as preservative #1 except that the leaves and seeds are not used, but instead, the branches and bark of the Mamaki plant are used. The branches are cut into lengths of an inch or two and are split to increase the area of contact of the water therewith. I fill a 1½ gallon pot with these split branches and then pour over them one gallon of boiling water. The cooking process described above for the making of preservative #1 is then repeated and yields about 3½ quarts of preservative #2.

*Use of the preservatives*

My experience with these preservatives has been largely in connection with various varieties of the maidenhair fern, indigenous to Hawaii. Although my process may be used to advantage on ferns in various stages of development, it is desirable that the ferns be cut or picked just before they have reached full maturity. In the maidenhair fern, the optimum time for picking can be determined by observation of the stage of development of the seed pods appearing at the outer ends of the leaves. These pods should not be developed and brown, but should be young and green since ferns picked at this stage of development will last longer after being processed than will the older ones, the stems of which also become brittle after processing.

A close inspection of the stem of the maidenhair fern will show that it consists of an outer dark-colored bark; next to it, a light lining; and finally a soft pulp-like center of the stem. It is the light lining that must be processed and this lining apparently contains a fluid which not only seals the cut end of the stem but also seals the inside of the stem against absorption of water through the bark.

One purpose to be accomplished by the processing is the temporary softening of the sealing fluid in the bark lining to permit passage of water therethrough. Through practical experiment I have discovered that the immersion of the stems in warm water will give the desired softening effect and that the subsequent chilling of the stems in ice water will reharden the sealing fluid and retain the moisture in the plant.

In processing the New Zealand giant maidenhair fern, I have found that a very effective method includes picking the fern and immediately immersing it in a solution of one teaspoon of the preservative #2 to one gallon of water. As soon as possible after the fern is cut it should be processed as described in my Patent 2,581,299, the present process being an improvement thereover.

This patented process includes the steps of heating a receptacle of water to about 125° F. If the water is cooler, it will not soften the sealing fluid inside the bark; if it is warmer, the plant is apparently injured by the heat, or perhaps the sealing fluid is dissolved and carried off.

The ferns should be loosely tied in convenient size bunches with the branches from the main stems tied upwardly so that the leaves may be kept out of the warm water. As much of the stems should be immersed as possible, but the leaves and about the last two or three inches of stem adjacent thereto should be kept clear of the warmth and, in fact, sprinkled or sprayed thoroughly on both sides with cool water since heat has a drying effect on the leaves. The length of time for immersion in the warm water depends on the size of the stems. It is better not to leave the stems in the warm water any longer than necessary to permit sufficient absorption of moisture. Too long a period of immersion makes the stems brittle after processing. For stems of about ⅓" at the cut end, about two minutes of immersion is optimum. One tenth inch diameter requires about one and one-half minutes; whereas stems of ½₀" diameter require one minute; and stems of ¼₀" diameter require only about twenty seconds.

The water thus absorbed by the stem goes to the leaves as is indicated by a slight swelling up thereof and by the fact that whenever I process any large number of ferns, the water disappears from the container noticeably. As the ferns are removed from the 125° water, if the stems are held upright, the water will run out at the cut end, but if the ferns are inverted, the water will run into the leaves. The ferns should be held in this latter position under a cold shower for a short time to cool the ferns and to relieve the shock of the warm water in the leaves. When properly chilled, the leaves will retain more water and will have a more graceful appearance.

Upon completion of these water immersion steps, the fern is placed in a solution of 1 teaspoon of preservative #1 to one gallon of water for about 30 minutes, and is finally returned to a solution of 1 teaspoon of preservative #2 in one gallon of water for about 30 minutes. Subsequently, it is helpful to cut about a quarter inch off of the stem about once a day or whenever the leaves show signs of drying, and to keep the cut end of the stems in water.

In processing the regular variety of soft-stemmed maidenhair ferns, the fern is cut and immediately immersed in the #2 preservative as in the case of the New Zealand giant maidenhair fern. The fern is then removed and given the warm and cold water immersion treatment, Patent No. 2,581,299, and is then immersed in the #1 preservative solution (1 teaspoon to 1 gallon of water) for about 7 minutes. Finally the fern is immersed about 7 minutes in the #2 preservative solution (1 teaspoon to 1 gallon of water).

It will be noted that the processing of the regular soft-stemmed fern differs from the processing of the New Zealand giant fern chiefly in the length of time of the immersion. I have also found that in the warm water immersion step, the temperature of the water should be about 150° for best results.

Experience has shown that the sooner either variety of fern is subjected to the warm and cold water immersion process (Pat. 2,581,299) the better will be the results. The initial step of immersing the fern in the #2 preservative solution immediately after cutting is desirable but not necessary if the fern is given the warm and cold water processing within 20 minutes after it is cut.

In addition, it appears that, once fully processed, either variety of fern may be kept for a longer period of time if the bottom of its stem is placed in water containing a few drops of the #2 preservative.

I have used several types of preservatives, all made from the Mamaki plant. At first I made a preservative by comminuting leaves, seeds and branches of the plant and boiling them for many hours to obtain a liquid preservative, yielding about one quart, when strained, from the initial gallon of water. This preservative is effective when used after the warm and cold water processing (Patent 2,581,299), the fern being immersed for 20 to 30 minutes in a solution of this preservative (a teaspoon to a gallon of water). However, it appears that somewhat better results can be obtained if the ferns are processed as described above employing preservatives Numbers 1 and 2. In any event, if the fern is permitted to absorb too much preservative, the normally green leaves will show brown streaks.

I have also used Mamaki solutions to assist in preserving other cut foliage and flowers, such as the Vanda orchid which kept for four weeks before it faded, though my experiments on other plants have been quite limited.

I do not limit my invention to use with maidenhair ferns since the preservation of other varities of plants is also materially assisted thereby.

I claim:

1. The method of making a preservative from the Mamaki plant including the following steps, cutting and comminuting the leaves, seeds, and stems of the plant; boiling the comminuted plant in water to remove the natural essence therefrom; and separating the solid residue from the liquid preservative resulting from the boiling step.

2. The product of the process set forth in claim 1.

3. The method of making a preservative from the Mamaki plant including the following steps, cutting and comminuting the leaves and seeds of the plant; boiling the comminuted plant in water to remove the natural essence therefrom; and separating the solid residue from the liquid preservative resulting from the boiling step.

4. The product of the process set forth in claim 3.

5. The method of making a preservative from the Mamaki plant including the following steps, cutting and comminuting the stems and bark of the plant; boiling the comminuted plant in water to remove the natural essence therefrom; and separating the solid residue from the liquid preservative resulting from the boiling step.

6. The product of the process set forth in claim 5.

7. The process of preserving the freshness of cut plants having stems, comprising the steps of cutting the plant and immersing the stems in warm water for the minimum time required to permit the plant to absorb as much of the water as it can hold; immersing the plant in cold water until it is cooled; and immersing the plant in a weak aqueous solution of preservative made by boiling a comminuted Mamaki plant in water to remove its essence.

8. In a process as set forth in claim 7, the step of immersing the cut plant in said preservative solution immediately after cutting and prior to said warm water immersion.

9. In a process as set forth in claim 7, the final step of placing the processed plant with its cut stem in water containing several drops of the preservative.

10. The process of preserving the freshness of cut leafy ferns of the maidenhair or similar variety having stems, comprising the steps of cutting the fern and immersing the stems in warm water for the minimum time required to permit the plant to absorb as much water as it can hold; immersing the fern in cold water until it is cooled; immersing the fern in a weak aqueous solution of a first preservative made by boiling comminuted leaves and seeds of the Mamaki plant in water to remove its essence; and transferring the fern to a weak aqueous solution of a second preservative made by boiling comminuted stems and bark of the Mamaki plant in water to remove the essence therefrom.

11. In a process as set forth in claim 10, the step of immersing the cut fern in the second mentioned preservative solution immediately after cutting and prior to said warm water immersion.

12. In a process as set forth in claim 10, the final step of placing the processed fern with its cut stem in water containing several drops of the second mentioned preservative.

13. The process as set forth in claim 10, wherein the immersions in the respective first and second preservative solutions each continue for an interval of time with the range of about 7 minutes to 30 minutes.

14. The process as set forth in claim 10, wherein the temperature of said warm water falls within the range of from 125° F. to 150° F.

References Cited in the file of this patent

FOREIGN PATENTS 1,374    Great Britain _____ of 1877

OTHER REFERENCES

"New Garden Encyclopedia" (Seymour), published by Wm. H. Wise & Co. (N. Y.), 1941. Pages 352 and 353.

Taylor's Encyclopedia of Gardening, 2nd ed. (1948), page 263.